United States Patent
Michel et al.

(10) Patent No.: US 8,033,236 B2
(45) Date of Patent: Oct. 11, 2011

(54) HANDBRAKE LOAD INDICATOR

(75) Inventors: Mark Michel, Greer, SC (US); Thomas S. Head, Greenville, SC (US)

(73) Assignee: Ellcon National, Inc., Greenville, SC (US)

( * ) Notice: Subject to any disclaimer, the term of this patent is extended or adjusted under 35 U.S.C. 154(b) by 1388 days.

(21) Appl. No.: 11/517,976

(22) Filed: Sep. 8, 2006

(65) Prior Publication Data

US 2007/0062765 A1 Mar. 22, 2007

Related U.S. Application Data

(60) Provisional application No. 60/717,819, filed on Sep. 16, 2005.

(51) Int. Cl.
*B60Q 1/44* (2006.01)

(52) U.S. Cl. .................. 116/52; 116/58 A; 188/1.11 R; 73/862.471

(58) Field of Classification Search .............. 116/51–53, 116/28 R, 35 R, 58 A, 303, 284; 73/862.391, 73/862.471; 340/453–454; 188/1.11 R, 188/107
See application file for complete search history.

(56) References Cited

U.S. PATENT DOCUMENTS

| | | | | |
|---|---|---|---|---|
| 1,498,289 A | * | 6/1924 | Parsley .................. 73/862.541 |
| 1,568,804 A | * | 1/1926 | Cowdrey .................. 73/130 |
| 1,676,774 A | * | 7/1928 | Cronk .................. 73/131 |
| 2,022,844 A | * | 12/1935 | Christian .................. 212/283 |
| 2,087,386 A | * | 7/1937 | Norton .................. 340/454 |
| 2,289,864 A | * | 7/1942 | Belinkine .................. 73/514.01 |
| 2,592,868 A | * | 4/1952 | Cushman .................. 73/862.471 |
| 2,752,007 A | * | 6/1956 | Doolan .................. 187/281 |
| 2,909,389 A | * | 10/1959 | Wilborn .................. 301/5.22 |
| 3,587,307 A | * | 6/1971 | Newberg .................. 73/862.21 |
| 3,854,417 A | * | 12/1974 | MacDonnell et al. ..... 105/463.1 |
| 3,859,840 A | * | 1/1975 | Gause .................. 73/1.08 |
| 4,296,707 A | * | 10/1981 | Kennedy .................. 116/58 A |
| 4,362,053 A | * | 12/1982 | Barrett .................. 73/121 |
| 4,373,402 A | * | 2/1983 | Barrett .................. 73/862.391 |
| 4,625,551 A | * | 12/1986 | Carnielli .................. 73/379.07 |
| 4,649,370 A | * | 3/1987 | Thomason .................. 340/453 |
| 4,714,142 A | | 12/1987 | Shepherd |
| 4,879,964 A | * | 11/1989 | Emerson, Jr. .................. 116/28 R |
| 5,226,509 A | * | 7/1993 | Smith .................. 188/1.11 W |
| 5,358,075 A | * | 10/1994 | Jarzombek .................. 188/1.11 L |
| 5,372,221 A | * | 12/1994 | Jalbert .................. 188/1.11 L |
| 5,394,137 A | * | 2/1995 | Orschek .................. 340/453 |
| 5,701,974 A | * | 12/1997 | Kanjo et al. .................. 188/1.11 R |
| 5,738,416 A | * | 4/1998 | Kanjo et al. .................. 303/7 |
| 5,827,149 A | * | 10/1998 | Sponable .................. 477/92 |

(Continued)

*Primary Examiner* — R. A. Smith
*Assistant Examiner* — Tania Courson
(74) *Attorney, Agent, or Firm* — Nelson Mullins Riley & Scarborough, LLP

(57) ABSTRACT

A load indicator for use with a railway car hand brake that is connected to a railway car brake rigging comprising a housing, a plurality of levers pivotally mounted in the housing, each of the plurality of levers having a first end and an opposite second end, a plate coupled to each of the plurality of lever second ends, wherein the plate is moveable with respect to the housing, and a plurality of springs each operatively coupled between a respective one of the plurality of lever first ends and the housing. At least one of the plurality of lever first ends is moveable between a first position in which tension exerted on the plate from the railway car hand brake is within a predetermined range, and a second position in which tension exerted on the load indicator from the railway car brake rigging is outside the predetermined range.

17 Claims, 7 Drawing Sheets

U.S. PATENT DOCUMENTS

| | | | |
|---|---|---|---|
| 6,055,737 A * | 5/2000 | Sweaney | 33/534 |
| 6,170,619 B1 | 1/2001 | Sheriff et al. | |
| 6,237,722 B1 | 5/2001 | Hammond et al. | |
| 6,267,494 B1 * | 7/2001 | Burch | 366/41 |
| 6,364,069 B1 | 4/2002 | Ring | |
| 6,397,978 B1 | 6/2002 | Jackson et al. | |
| 6,427,811 B1 * | 8/2002 | Wedge et al. | 188/162 |
| 6,474,450 B1 | 11/2002 | Ring et al. | |
| 6,474,451 B1 | 11/2002 | O'Brien | |
| 6,913,325 B2 * | 7/2005 | Michel et al. | 303/2 |
| 6,943,675 B2 * | 9/2005 | Petersen et al. | 340/453 |
| 7,121,388 B2 * | 10/2006 | Ring et al. | 188/153 R |
| 7,559,411 B2 * | 7/2009 | Michel et al. | 188/34 |
| 7,584,813 B2 * | 9/2009 | Yoshida | 180/65.29 |

* cited by examiner

HANDBRAKE LOAD INDICATOR

CLAIM OF PRIORITY

This application claims priority to U.S. Provisional Patent Application No. 60/717,819, filed Sep. 16, 2005, the entire disclosure of which is incorporated by reference herein.

BACKGROUND OF THE INVENTION

This invention relates to hand operable brake mechanisms and particularly, to a handbrake load indicator for railway cars.

Railway car handbrake mechanisms are well known and may include a rotatable wheel or lever that provides upward tension on a chain that is secured at its distal end to a brake rigging of the railway car. Sufficient force must be applied on the brake shoes of the railway car to releasably secure the wheels in a locked position to prevent the railway car from moving. An under applied brake can result in unwanted movement of the car, for example a runaway car. On the opposite end of the spectrum, an over applied brake may result in damage or failure to the brake rigging.

Previously, it has been industry standard to apply 125 pounds of force to the end of the brake lever or 125 pounds of torque force on a wheel to properly apply the handbrake. Currently, certain segments of the railway industry have lowered the 125 pound requirement to 74 pounds. This lowered threshold can result in many more instances when the handbrake is over applied. When is to be fully applied with 125 pounds, there exists the possibility of the handbrake being under applied. Thus, a mechanism is needed that alerts the operator when the brake is properly applied to within a predetermined range.

SUMMARY OF THE INVENTION

The present invention recognizes and addresses the foregoing disadvantages, and others, of prior art constructions and methods.

The present invention provides a load indicator for use with a railway car hand brake that is connected to a railway car brake rigging comprising a housing, a plurality of levers pivotally mounted in the housing where each of the plurality of levers has a first end and an opposite second end. A plate is coupled to each of the plurality of lever second ends and is moveable with respect to the housing. A plurality of springs are each operatively coupled between a respective one of the plurality of lever first ends and the housing. At least one of the plurality of lever first ends is moveable between a first position in which tension exerted on the plate from the railway car brake rigging is within a predetermined load indicator range, and a second position in which tension exerted on the plate from the railway car brake rigging is outside the predetermined load indicator range.

In another embodiment, a load indicator for use with a railway car hand brake that is connected to a railway car brake rigging comprises a housing, at least one lever pivotally mounted in the housing, the lever having a first end and an opposite second end. A plate is coupled to the lever second end, wherein the plate is moveable with respect to the housing. A spring is operatively coupled between the lever first end and the housing, wherein the at least one lever first end is moveable between a first position in which a load on the plate is within a predetermined load indicator range, and a second position in which the load on the plate is outside of the predetermined load indicator range.

Each of the above described embodiments may have a rocker arm intermediate the spring and lever first end. The plate may be coupled to the lever second end by a threaded fastener. Additionally, the housing may have a window formed therein so that the lever first end is viewable through the housing window. Each of the levers may be pivotally mounted on a shaft so that as force is applied by the hand brake on the railway car brake rigging, the plate moves with respect to the housing.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
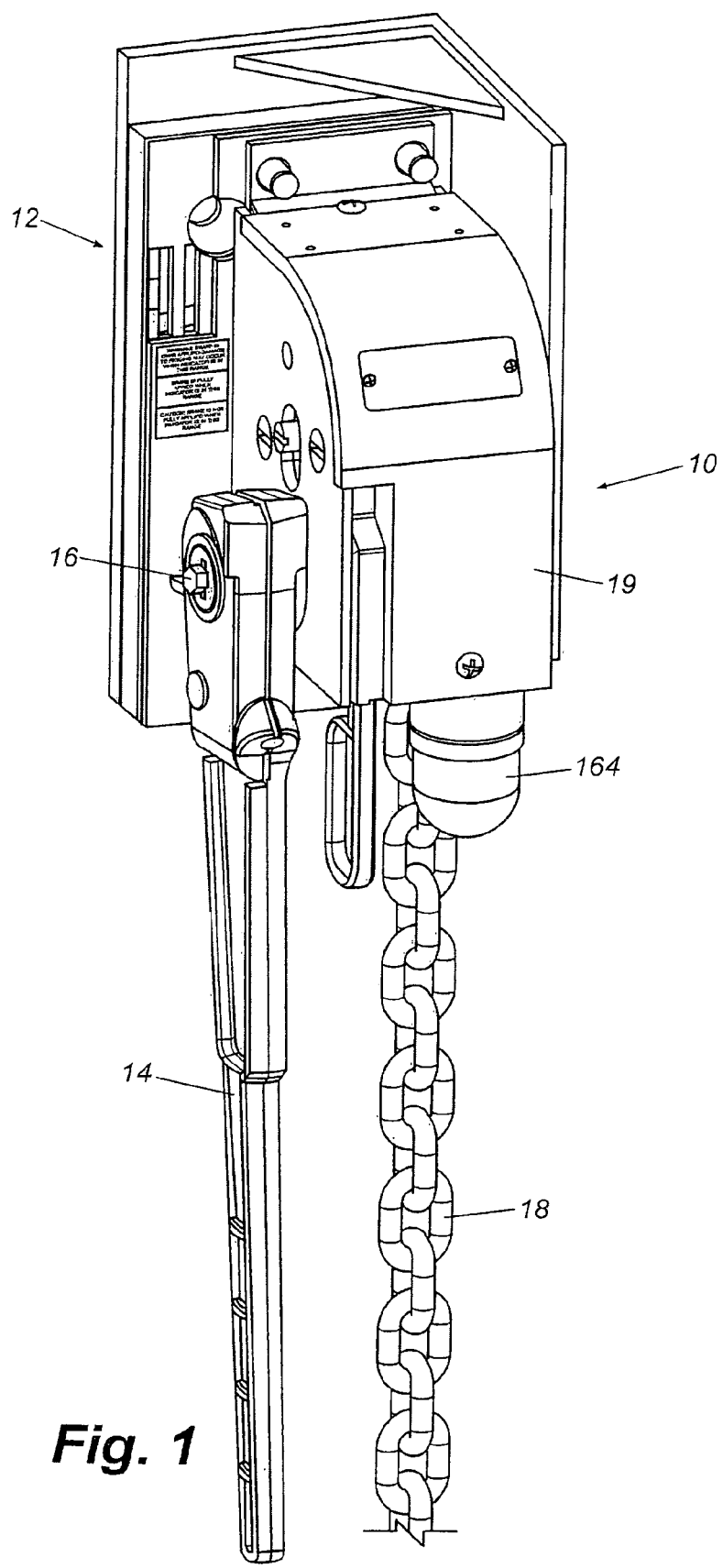
FIG. 1 is a perspective view of a handbrake mechanism coupled to a load indicator of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a handbrake mechanism 10 is shown mounted on a load indicator 12 of the present invention. Handbrake mechanism 10 may be any form of manual handbrake for use on vehicles, such as railway cars. Examples of a handbrake for use with the present invention include a lever type handbrake mechanism, for example as shown in U.S. Pat. No. 6,397,978 issued to Jackson et al. and a wheel type handbrake mechanism, for example as shown in U.S. Pat. No. 4,714,142 assigned to Ellcon-National, Inc.

The lever-type handbrake illustrated in FIG. 1 includes a lever 14 rotatably coupled on a shaft 16 to a gear mechanism (not shown). The lever ratchets about an axis of the shaft in a first direction and applies rotational torque to the shaft and gear mechanism in a second opposite direction. The gear mechanism and shaft are coupled to a chain 18 and are configured to apply upward tension on chain 18, which is secured at its distal end to a brake rigging of the railway car. Thus, upward tension on chain 18 causes the brake rigging to engage the brake shoes and brake drum or rotor, thereby rotationally fixing the wheels of the railway car. Because these types of handbrakes are well known to one of ordinary skill in the art, a detailed discussion of wheel type and lever type handbrake operation will not be included herein.

Figure 2:
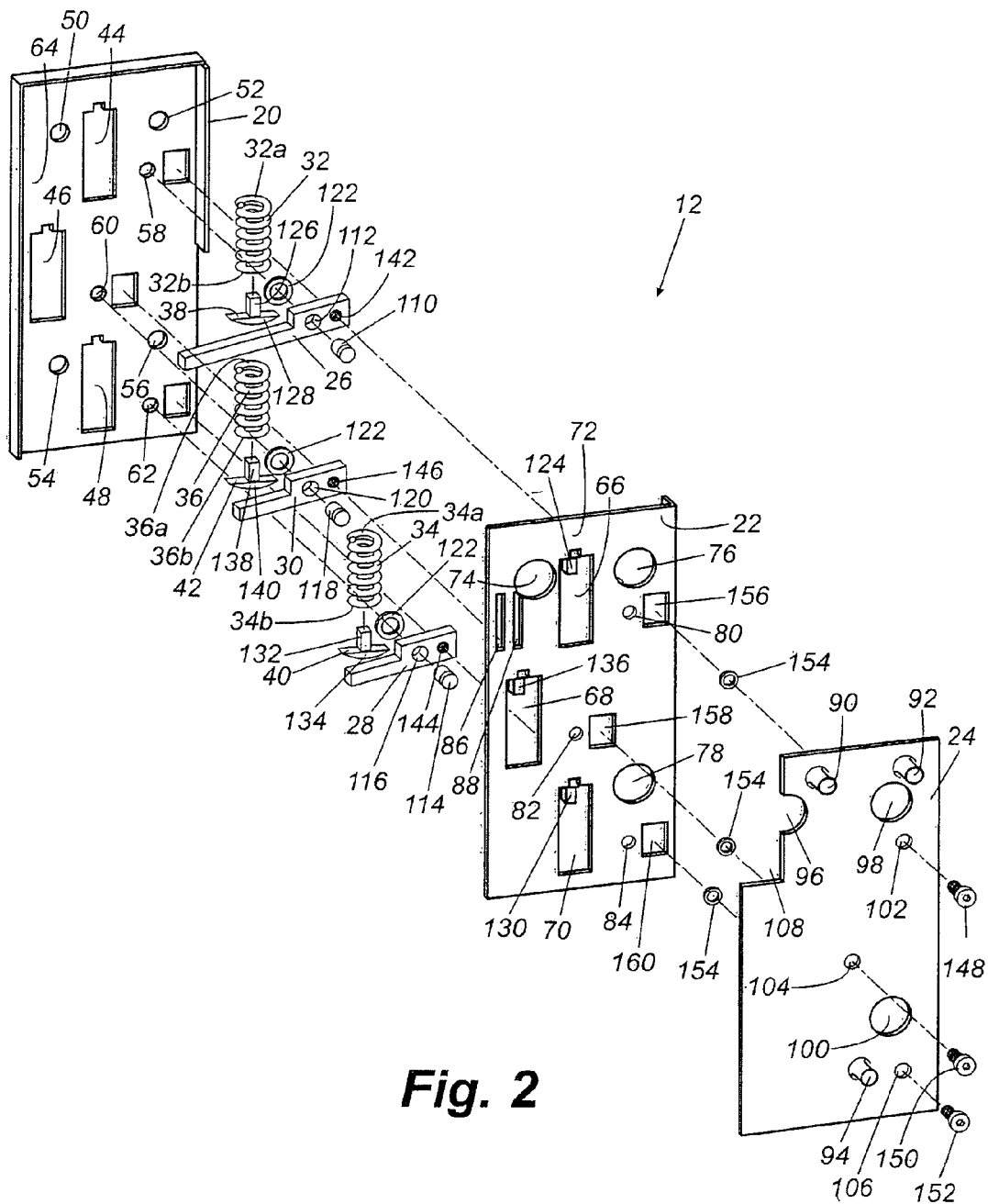
FIG. 2 is an exploded perspective view of the load indicator of FIG. 1.

Referring to FIG. 2, visual load indicator 12 is shown having a rear housing 20, a front housing 22, a loading plate 24, multiple levers 26, 28 and 30, multiple springs 32, 34 and 36, and rocker arms 38, 40 and 42. Rear and front housings 20 and 22, respectively, may be formed from any suitable material such as stainless steel, metal alloys, iron and polymers. In one preferred embodiment the housings are formed from a metal alloy and are fastened together to form a single unit. It should be understood that the front and rear housings may be fastened together by screws, bolts, rivets or any other suitable means of fastening the two halves, and in one preferred embodiment, the front and rear housings are welded together.

Figure 3:
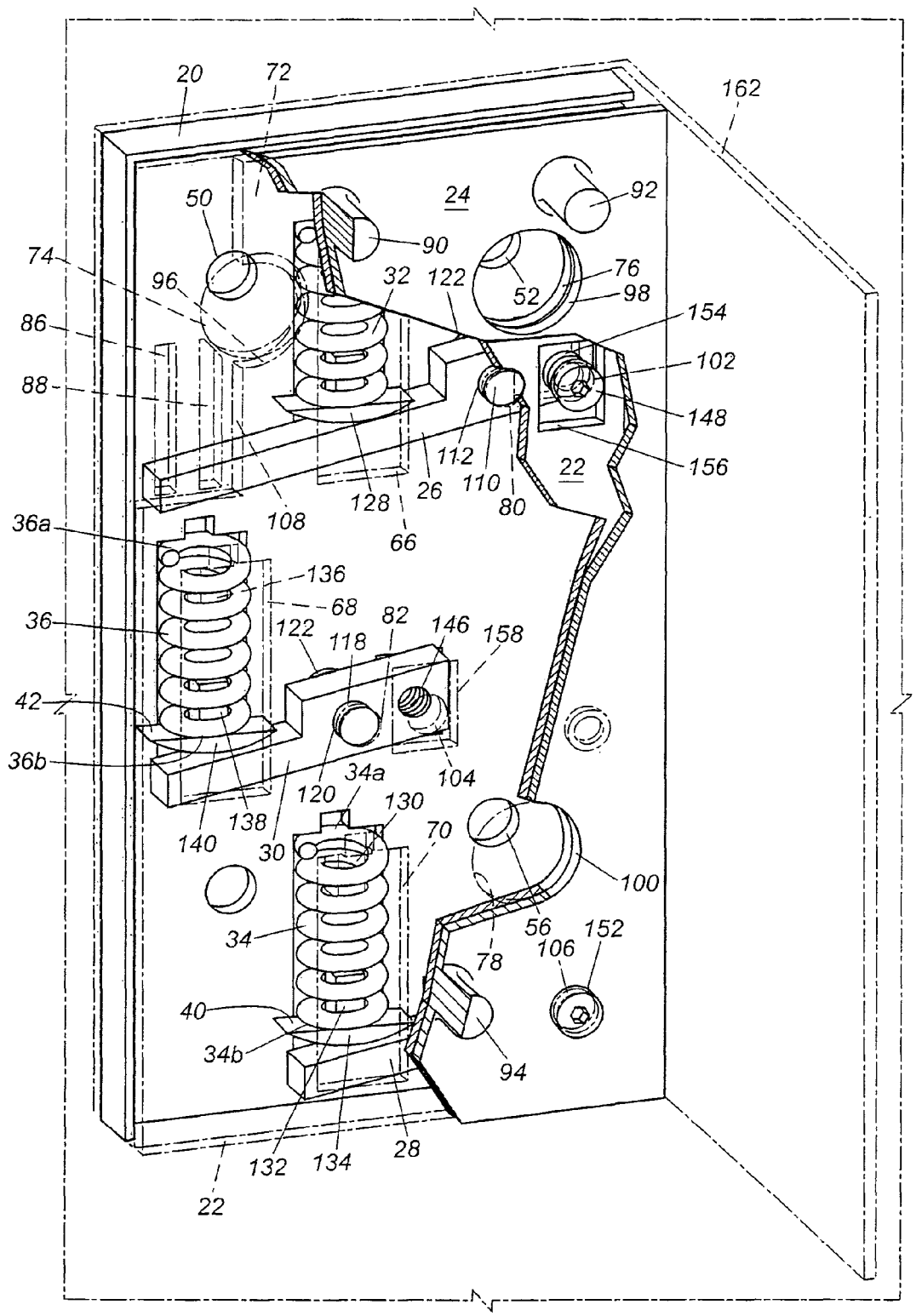
FIG. 3 is a partial cutaway of the load indicator of FIG. 1.

Rear housing 20 is generally rectangular in shape and defines a plurality of openings through a back plate 64. In particular, the openings consist of a plurality of generally rectangular openings 44, 46 and 48 and a plurality of generally circular openings 50, 52, 54, 56, 58, 60 and 62. Front housing 22 is also generally rectangular in shape and defines a plurality of openings through a front plate 72. Specifically, the openings consist of three generally rectangular openings 66, 68 and 70 that align with openings 44, 46 and 48 and a plurality of generally circular openings 74, 76, 78, 80, 82 and 84. Two vertical elongated openings 86 and 88 are formed generally parallel to each other in the upper left hand corner of front plate 72. The purpose of the openings is discussed in detail herein. Referring to FIG. 3, front and rear housings 22 and 20, respectively, are shown forming a unitary housing with load plate 24 moveably mounted thereon via levers 26, 28 and 30. One of ordinary skill in the art should understand that the shape of the front and rear housings may be changed so long as they fit together to form a suitable housing for the working parts.

Load plate 24 is generally rectangular in shape and includes three mounting pegs 90, 92 and 94 for releasably securing manual brake mechanism 10 to the load plate. Three generally circular openings 96, 98 and 100 are formed through load plate 24 and align with front plate openings 74, 76 and 78, respectively. Additionally, three mounting holes 102, 104 and 106, and a rectangular cutout area 108 are also formed in and through load plate 24. The various openings and holes facilitate mounting of the load plate to the housing and the housing to the railway car, as further explained in greater detail below.

The following discussion focuses in detail on the interconnection of lever 26 and load plate 24 with the understanding that the connection of levers 28 and 30 are similar. Referring to FIGS. 2 and 3, lever 26 is rotatably received on a shaft 110 through a bore 112 formed transverse to the longitudinal axis of the lever. Shaft 110 is received in generally circular openings 58 and 80 such that lever 26 can rotate about shaft 110. Similarly, levers 28 and 30 are rotatably received on respective shafts 114 and 118 through respective bores 116 and 120 formed through the levers. Shaft 114 is mounted in generally circular openings 62 and 84, and shaft 118 is mounted in generally circular openings 60 and 82. To facilitate a smooth motion of each lever, a spacer 122 is mounted on each shaft intermediate the lever and back plate 64.

Lever 26 is coupled to a spring 32 that is received in back and front plate openings 44 and 66. One end 32a of spring 32 is coupled to a pin 124 and the other spring end 32b is coupled to rocker arm 38. Rocker arm 38 includes a pin 126 coupled to spring end 32b and a curved base 128 that engages with lever 26. Springs 34 and 36 are received in similar openings in the back and front plates and engage respective levers 28 and 30 through respective rocker arms 40 and 42. Rocker arms 40 and 42 each have a pin 132 and 138 and a curved base 134 and 140, respectively. In one preferred embodiment, springs 32, 34 and 36 are die springs but, one of ordinary skill in the art should understand that the springs may be Belleville springs, wave springs, coil springs or any other suitable spring. Additionally, the spring material may be chosen from any suitable material such as metal alloys, stainless steel, polymers and elastomers.

Load plate 24 is moveably attached to the front and rear plates through levers 26, 28 and 30. That is, each of levers 26, 28 and 30 has a respective threaded bore 142, 144 and 146 that receives one of a plurality of respective fasteners 148, 152 and 150. Each fastener is first received through a respective mounting hole 102, 106 and 104, a respective square opening 156, 160 and 158 and through a respective spacer 154. Each spacer is located intermediate load plate 24 and its respective lever and is partially maintained in one of square openings 156, 158 and 160. Thus, as load plate 24 moves relative to front plate 22, the spacers act as stops to prevent the load plate from moving an excessive amount under undue loading since the spacers will abut the walls of the square openings.

Still referring to FIG. 3, handbrake load indicator 12 is shown mounted to a structure 162 of the railway car. Mounting is easily performed through paired openings 74 and 96, 76 and 98 and 78 and 100 since the respective mounting holes 50, 52 and 56 are accessible even when the load plate is attached to front housing 22. Because the openings in the load plate and front plate are larger than those in the back plate, the user can mount the fastener with a tool to secure the back plate to the railway car structure prior to mounting handbrake 10 to the load plate. Any suitable fastener may be used to mount the load indicator to the railway car, for example, screws, bolts and nuts, rivets and weldments. In one preferred embodiment, nuts and bolts (not shown) are used to secure load indicating device 12 to the railway car structure.

Figure 4A:
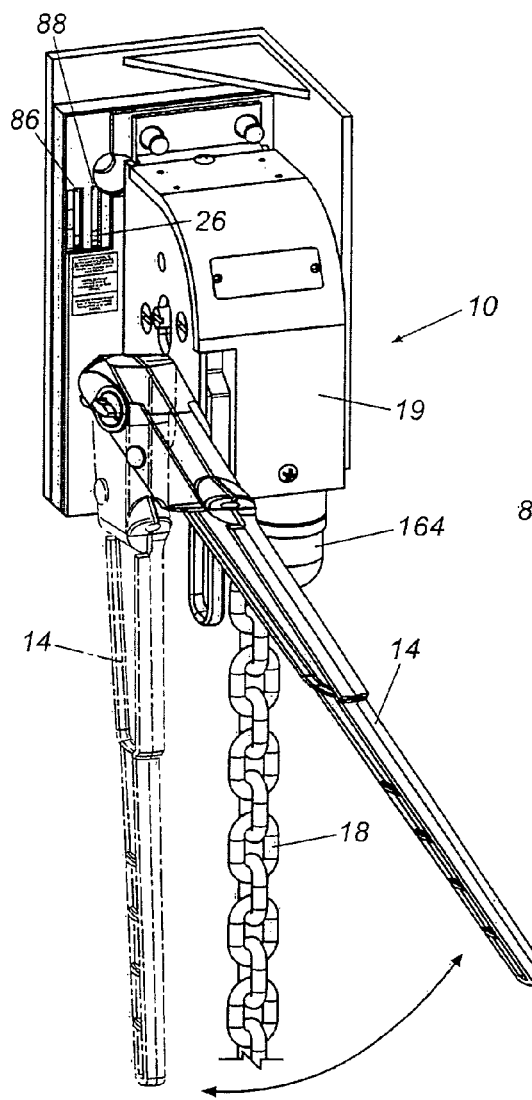
FIGS. 4A and 4B are perspective views of the handbrake and load indicator of FIG. 1 in operation.
Figure 4B:
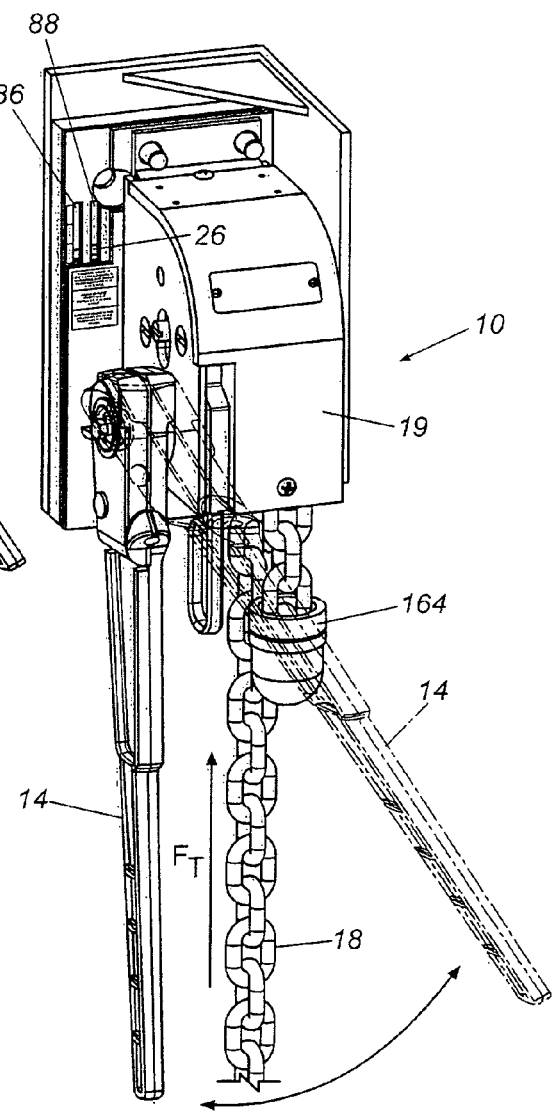

Referring to FIGS. 4A and 4B, the user operates handbrake 10 by lifting and lowering handle 14. Each time handle 14 is lifted, it provides rotational torque to a chain gear (not shown) that moves chain 18 up through the brake housing 19 and back out. When the handle is lowered, it ratchets over a ratchet wheel. Thus, as chain 18 moves through brake housing 19, it's the distal end of the chain, which is connected to a weight 164, drops, as shown in FIG. 4B. As the chain is pulled through housing 19, an upward tension force $F_T$ is placed on chain 18, which in turn activates the brake rigging on the railway car. In prior art braking systems, it was not possible to tell when a sufficient tension force was placed on chain 18. However, in the present invention, load indicator 12 is provided with a visual indicator that alerts the user when tension force $F_T$ on the chain is sufficient to activate the brake, is too little to activate the brake, or is excessive which may damage the brake rigging.

Figure 5A:
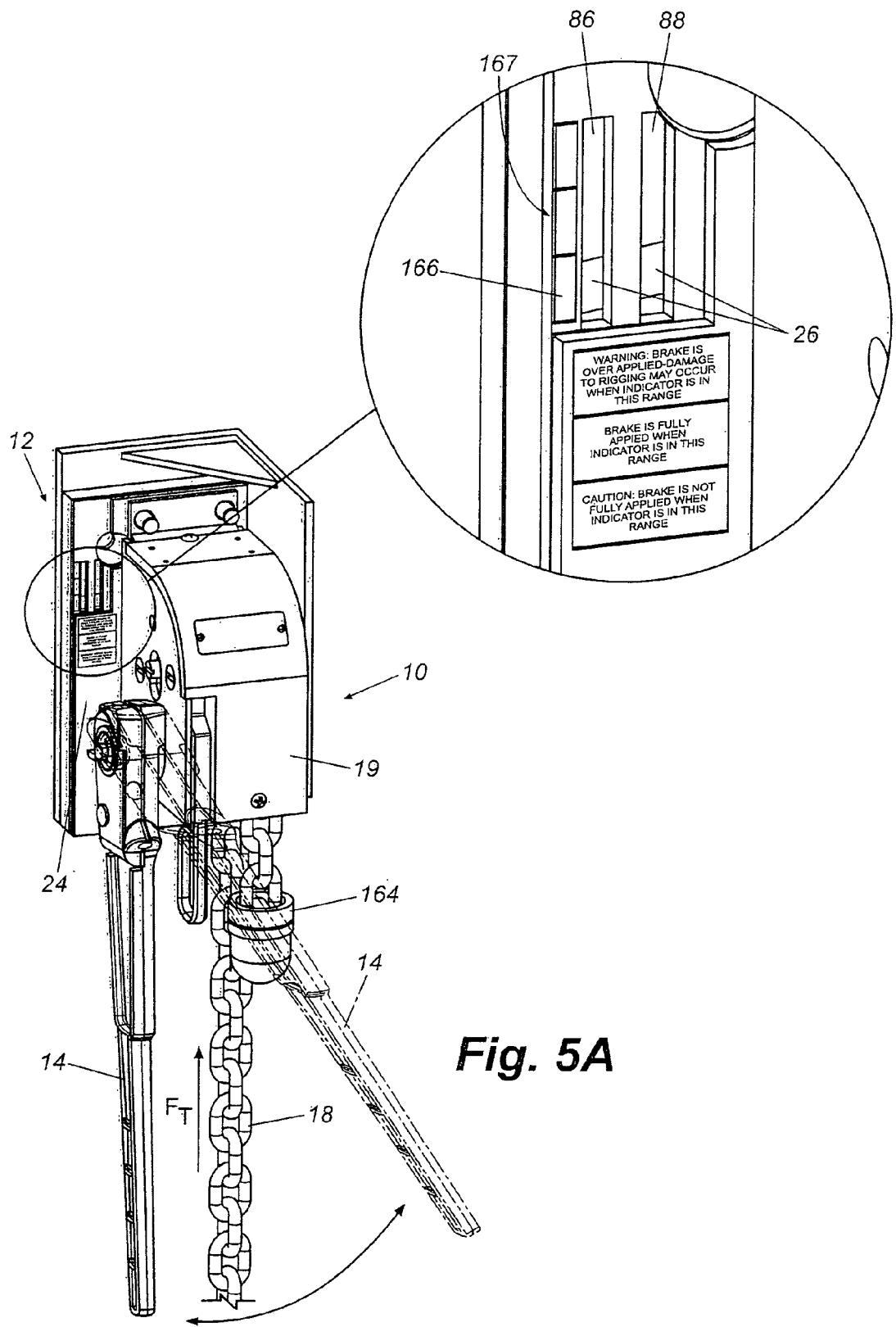
FIGS. 5A, 5B and 5C are perspective views of the handbrake and load indicator of FIG. 1 shown in several modes of operation.

Referring to FIG. 5A, handbrake 10 is shown as handle 14 is lifted and lowered so that an initial tension force $F_T$ is exerted on chain 18. As the tension pulls on the chain, the upward force causes a downward reaction force on handbrake 10, which in turn pulls downward on load plate 24. As shown in the magnified portion of FIG. 5A, because lever 26 is longer than the other levers and is sized and positioned so that it is viewable through openings 86 and 88, the lever is viewable through windows 86 and 88. A scale 167 is denoted along opening 86, and lever 26 is shown in predetermined load indicator range 166, which indicates that too little force has been applied on chain 18 by the handbrake to properly apply the brake. This provides the user with information that additional force is necessary.

Referring once again to FIG. 3, as downward force is applied on handbrake 10 by chain 18, load plate 24 is pulled downward with respect to the housing front plate. This downward force causes levers 26, 28 and 30 to each rotate clockwise about their respective shafts causing the ends of the lever to provide upward force against their respective rocker arms and springs. The interaction of the rocker arm curved base and lever allows the rocker arm to tilt as upward bias is applied by the lever against the spring. This tilting action uniformly distributes the load on the spring across the spring end so that the spring does not kink. In the preferred embodiment, compression springs are used since failure of one or more springs in a compressed state is unlikely. It should be understood, however, that tension springs (not shown) or coiled springs (not shown) may also be used to connect the lever to the housing. However, the reliability of these types of connections between the housing, the spring and the lever are not as reliable as compared to the described embodiment.

Figure 5B:
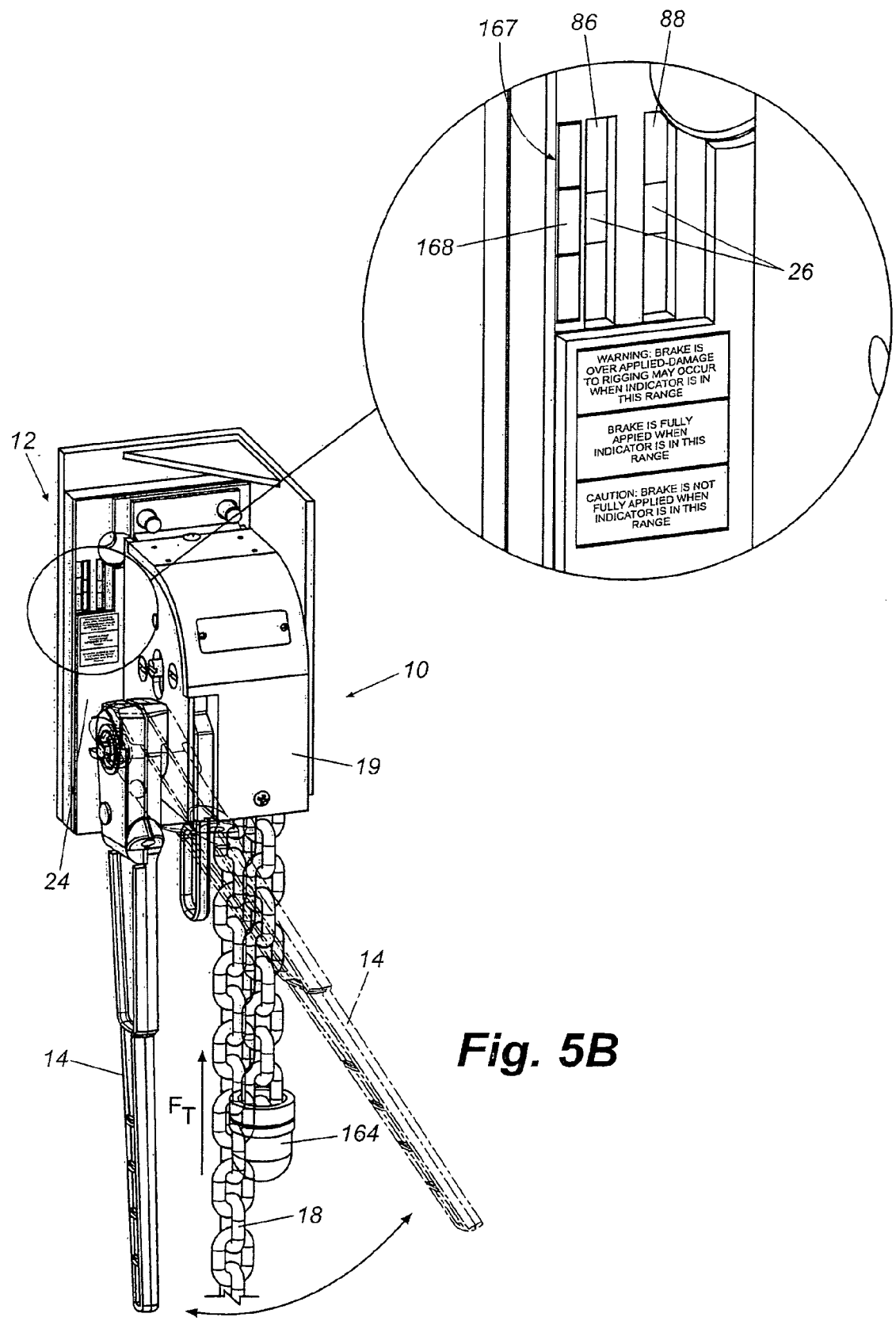

Referring to FIG. 5B, continued movement of lever 14 exerts a larger tension force $F_T$ on chain 18, thereby resulting in a larger downward reaction force on load plate 24. As a result, levers 26, 28 and 30 are further rotated clockwise against the downward bias of their respective springs 32, 34 and 36. Accordingly, lever 26 moves into predetermined load indicator range 168, which indicates that the optimum force is being applied by handbrake 10 on the railcar brake rigging.

Figure 5C:
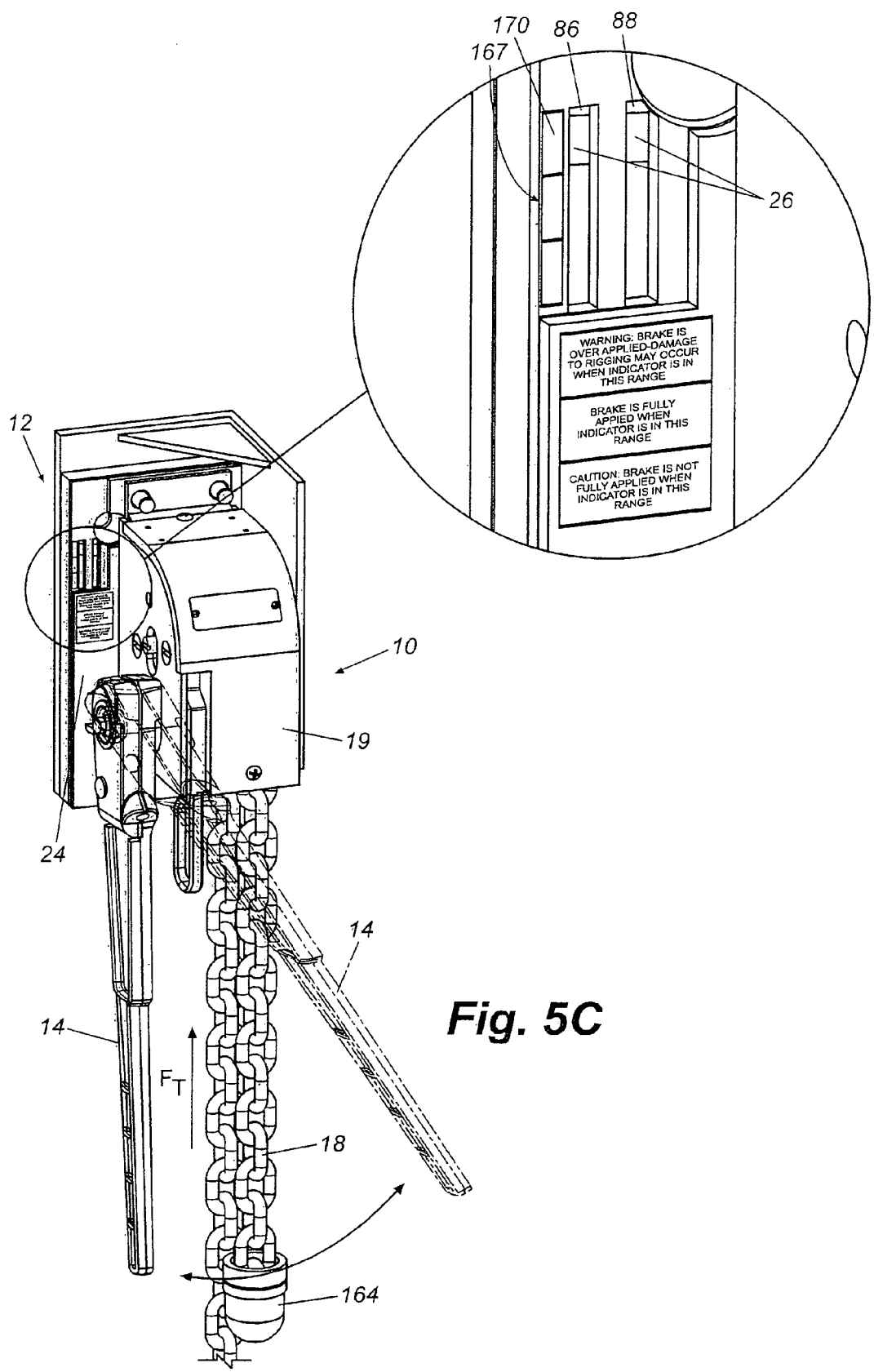

Referring to FIG. 5C, additional movement of lever 14 causes added tension force on chain 18 and the railway car brake rigging. The resulting downward reaction force on load plate 24 causes additional clockwise rotation of the levers. Consequently, lever 26 moves upward against the downward bias of spring 32 into the position shown in the exploded portion of the figure. That is, lever 26 moves into predetermined load indicator range 170, which indicates that excessive force has been applied to the brake rigging. In this situation, the operator can release the handbrake mechanism 10 and reapply tension on chain 18 until lever 26 moves into the optimal predetermined load indicator range 168.

Although the above detailed description is centered on the movement of lever 26 through load plate 24, as previously described all levers are connected to load plate 24 through fasteners 148, 150 and 152. Thus, as downward loads are placed on load plate 24, all levers rotate clockwise around their respective shafts. Accordingly, the combined compression forces of all three springs counteract the downward force exerted by the handbrake. Thus, several factors affect the optimal load that may be applied by handbrake 10. For example, the spring rate, number of levers and length of lever 14 all affect the load handling of load indicator 12. For example, increasing the size of the springs, the spring rate and/or the number of levers will increase the amount of loading that can be exerted on the load plate by the handbrake. Thus, the specific application of load indicator 12 will dictate the spring rate, size of the springs and the number of levers.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit thereof.

What we claim:

1. A visual load indicator for use with a railway car hand brake that is connected to a railway car brake rigging comprising:
   a. a housing;
   b. at least one lever pivotally mounted in said housing, said at least one lever having a first end and an opposite second end;
   c. a plate coupled to said lever second end, wherein said plate is moveable with respect to said housing;
   d. at least one spring operatively coupled between said at least one lever first end and said housing; and
   e. at least one rocker arm intermediate said at least one spring and said at least one lever first end,
   wherein said at least one lever first end is moveable between
      a first position in which a load on said plate is within a predetermined load indicator range, and
      a second position in which said load on said plate is outside of said predetermined range.

2. The load indicator of claim 1, further comprising a plurality of levers and springs, each spring operatively coupled between a respective one of said plurality of lever first ends and said housing, wherein each of said plurality of lever second ends is coupled to said plate.

3. The load indicator of claim 1, further comprising a hand brake coupled to said plate.

4. The load indicator of claim 1, wherein said plate is coupled to said at least one lever second end by a threaded fastener.

5. The load indicator of claim 1, wherein said housing has a window formed therein so that said at least one lever is viewable through said housing window.

6. The load indicator of claim 1, further comprising a shaft mounted in said housing, wherein said at least one lever pivots about said shaft as force applied by the railway car brake rigging moves said plate with respect to said housing.

7. A visual load indicator for use with a railway car hand brake that is connected to a railway car brake rigging comprising:
   a. a housing;
   b. a plurality of levers pivotally mounted in said housing, each of said plurality of levers having a first end and an opposite second end;
   c. a plate coupled to each of said plurality of lever second ends, wherein said plate is moveable with respect to said housing;
   d. a plurality of springs each operatively coupled between a respective one of said plurality of lever first ends and said housing; and
   e. a plurality of rocker arms, each positioned intermediate a respective one of said plurality of lever first ends and one of said plurality of springs,
   wherein at least one of said plurality of levers is moveable between
      a first position in which tension exerted on said plate from the railway car brake rigging is within a predetermined load indicator range, and
      a second position in which tension exerted on said plate from the railway car brake rigging is outside said predetermined range.

8. The load indicator of claim 7, wherein said housing is formed from a front plate and a back plate spaced apart from each other.

9. The load indicator of claim 7, wherein
a. said housing has a plurality of mounting pins formed thereon; and
b. each of said plurality of springs has a first end coupled to a respective one of said plurality of housing mounting pins and an opposite second end coupled to a respective one of said plurality of lever first ends.

10. The load indicator of claim 9, wherein said plate is coupled to each of said plurality of lever second ends by a respective threaded fastener.

11. The load indicator of claim 9, wherein when downward tension is exerted on said plate, said plurality of levers pivot against a bias of said plurality of spring second ends.

12. The load indicator of claim 7, wherein one of said plurality of levers is longer than the other of said plurality of levers.

13. The load indicator of claim 12, said housing having a window formed therein so that said longer one of said plurality of levers is viewable through said housing window as it moves between said first and said second positions.

14. The load indicator of claim 13, wherein said viewable lever indicates to a user when said tension applied to the railway car brake rigging is within said predetermined level.

15. The load indicator of claim 7, further comprising a hand brake mounted to said plate so that said hand brake is stationary with respect to said plate.

16. The load indicator of claim 7, wherein a size of each of said plurality of springs defines said predetermined load indicator range of tension.

17. The load indicator of claim 7, wherein said predetermined load indicator range of tension is adjustable to match a required output of the handbrake.

* * * * *